May 2, 1961

M. CHUN ET AL 2,982,666

METHOD OF CONDITIONING ORGANIC PIGMENTS
AND RESULTANT PRODUCT

Filed Dec. 8, 1958

INVENTORS
Morrison Chun
Archibald M. Erskine

BY

Attorneys

United States Patent Office 2,982,666
Patented May 2, 1961

2,982,666

METHOD OF CONDITIONING ORGANIC PIGMENTS AND RESULTANT PRODUCT

Morrison Chun and Archibald M. Erskine, Berkeley, Calif., assignors to The California Ink Company, Inc., San Francisco, Calif., a corporation of Delaware Filed Dec. 8, 1958, Ser. No. 778,753

8 Claims. (Cl. 106—308)

This invention relates to the conditioning of pigments, and more particularly to the production of finely divided, strong, soft textured organic pigments that have low vehicle absorption. Such condition pigments are readily dispersible in vehicles, and are capable of providing pigment-vehicle systems containing high proportions of pigment.

Crude pigments produced from the usual organic reactions are generally coarse in particle size, lacking in tinctorial strength and harsh in texture. For maximum efficiency and economy, it is necessary to condition the crude pigments in order to improve their properties. The resulting conditioned pigments are then described as being in a pigmentary state.

One method of conditioning crude pigments, which is applicable to both vat dyes and phthalocyanine pigments, involves dissolving the pigments in concentrated sulfuric acid and then re-precipitating them by adding the acid solution to a large volume of water, this method being known as acid pasting. However, the acid pasting process has many undesirable features including excessive consumption of acid, the presence of corrosive acid fumes, and the attendant necessity for disposing of the resultant dilute acid.

Numerous other methods have been employed in order to transform crude pigments into a pigmentary state. For example, a dry pigment has been ground with salt alone as a grinding aid. However, this process has disadvantages in the powdery and fluffy nature of the mix, and in the high ratios of salt to pigment that are employed. As a result the yields by this method are low, the cost per unit weight of pigment is high, and the product does not have as high strength as is to be desired.

Other processes have been based on the discovery that alpha copper phthalocyanine crystals may be converted into stable beta crystals by milling the pigment with crystallizing solvents, with or without salt. Under these conditions, the beta crystals which tend to form through the action of crystallizing solvents, are ground while in a powdery or pasty form to an extremely fine particle size to produce a pigment. However, undesirable steam stripping or alternatively extraction by acidic, alkaline or alcoholic solutions is required to separate the water immiscible crystallizing solvents and the pigment.

In accordance with the present invention and as a brief summary thereof, a finely divided, high strength and soft textured organic pigment having a low vehicle absorption is prepared by grinding in a heavy duty masticator a mixture of a crude, dry organic pigment, and an organic conditioning agent which binds the solids in the mixture by strong adhesive forces to form a tough, granular mixture. Advantageously, a water soluble grinding aid, such as salt, is also included in the mixture. After thoroughly grinding the mixture with the large amounts of power required to grind the tough granules, the ground mass is mixed with water to dissolve the organic liquid conditioning agent and any solid grinding agent that is present. Finally the undissolved conditioned pigment is mechanically separated from the water which contains the dissolved materials.

The organic conditioning agent used in the mixture must be capable of providing the desired tough, granular mixture which is attrition ground, it must be at least slightly water soluble for ready separation from the pigment, it should have a low volatility under grinding conditions, and it must be a liquid at the temperature of grinding. It has been found that the conditioning agents which have all of the important physical properties may be selected from the group consisting of polyols; ethers of polyols; esters of polyols; chlorinated derivatives of such polyols; and mixtures of such polyols, ethers, esters, and derivatives. When such organic conditioning agents are included in the mixture in an amount which converts the powdery material into a tough discontinuous system and which is not sufficient to produce a paste, heavy duty masticators and the use of large amounts of power are required to grind the mixture. Such attrition grinding produces the desired pigment properties in the crude product.

The pigment conditioning is obtained in accordance with the present invention only when the mix during grinding consists of a discontinuous mass of tough, compacted, granular particles with the organic conditioning agent acting as an adhesive binding the solid components together. These aggregated masses may be in the form of large lumps or they may be quite small giving the appearance of sandy granules. The desired conditioning is not obtained when the mass during grinding is either powdery and fluffy because of too little organic conditioning agent, or doughy and pasty as in prior art processes which use solvents or organic liquids.

The organic conditioning agents employed in the grinding process have no solvent action whatsoever on the pigment. Therefore, they do not act to convert alpha to beta crystals of copper phthalocyanine, and the control of these forms has no relationship to the present process. Furthermore, the organic liquids employed in the prior methods were added either in such small amounts as to retain powdery characteristics when the pigment-salt mixture was ground, or in amounts sufficient to create a continuous pasty or doughy system, which did not require masticators or high power input for grinding and did not produce the pigment conditioning obtained with the present process.

In the drawings

Figure 1:
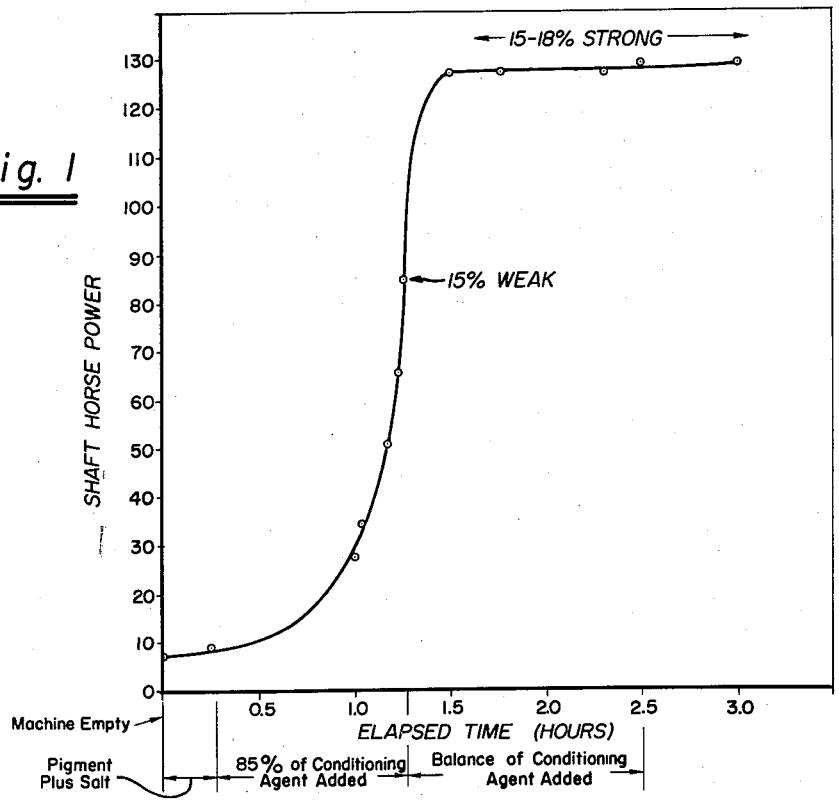
Fig. 1 is a graph which illustrates the high power required for grinding a pigment mixture prepared in accordance with the present invention. The data for the graph is given in Example 2.

In greater detail, any crude organic pigment may be advantageously conditioned by the process of this invention. Such crude pigments are conditioned after they have been prepared by any of the well known processes of making the crude organic pigments.

Examples of such pigments which may advantageously be conditioned by the method hereof are phthalocyanine pigments, represented by either chlorinated or unchlorinated copper phthalocyanine blue, other metal phthalocyanines such as nickel, cobalt and iron phthalocyanines, metal-free phthalocyanine, and polychloro copper phthalocyanine green. In addition, vat dye pigments, such as indanthrone, halogenated indanthrones, flavanthrone yellow, dibenzanthrone green, di-chloro iso-violanthrone, dibromo anthanthrone, pyranthrone, brominated pyranthrones (orange and scarlet), perylene red, acridone and oxazole reds, thio indigo and halogenated thio indigo (reds and maroons), are desirably treated by the conditioning method. Other organic pigment types also advantageously conditioned by the method hereof include carbazole dioxazine violet, also called Pigment Fast Violet R Base; red to violet quinacridone pigments; azo pigments and metal chelate azo pigments.

Organic conditioning agents suitable for this process are at least slightly water soluble. Even conditioning agents having a solubility in water at 25° C. less than 0.1 percent are satisfactory as long as they are least slightly soluble in water. When conditioning agents having a low solubility in water are utilized, the volume of water employed for separation of the conditioning agent from the conditioned pigment is large enough relative to the amount of the conditioning agent to extract the latter from the ground mixture.

Also, the agent should be liquid or semi-liquid at temperature of the mixture during grinding. In addition conditioning agents that have a boiling point well above the temperature produced during grinding are preferred, since they are relatively non-volatile at grinding temperatures. As a result, such conditioning agents do not evaporate and disappear from the mix during grinding. In addition they must have the property of binding the mixture together with strong adhesion to form tough, granular lumps during grinding.

The organic conditioning agents which have proven to be effective in providing the desired conditioned pigment are selected from the group consisting of polyols; ethers of polyols; esters of polyols; chlorinated derivatives of said polyols; and mixtures of such polyols, ethers, esters and chlorinated derivatives. The preferred type of such agents may be broadly represented by the empirical formula $(C_xH_yO_z)(X)_m$ in which C is carbon, H is hydrogen, O is oxygen, X is selected from the group consisting of radicals OH, $OCH_3$, $OC_2H_5$, $OC_3H_7$, $OC_4H_9$, $OOCCH_3$, Cl and combinations of such radicals, $x$ is at least two, $y$ is at least four, $z$ is any number including zero, and $m$ is at least two. Examples of such polyols are glycerol; 1,4 butane diol, trimethylol propane; 1,5 pentane diol; 1,2,6 hexane triol; hexylene glycol; sorbitol; and neopentyl glycol.

The most common group of these useful conditioning agents which comes within the foregoing broad formula is the class of alkylene and polyalkylene glycols and their mono- and di-ethers, esters, and chlorides which may be represented by the following more limited formula:

$$(X)(C_2H_3RO)_nC_2H_3R(X)$$

where C is carbon; H is hydrogen; R is selected from the group consisting of hydrogen, methyl, or ethyl; O is oxygen; X is selected from the group consisting of the radicals OH, $OCH_3$, $OC_2H_5$, $OC_3H_7$, $OC_4H_9$, $OOCCH_3$, Cl and combinations of such radicals, and $n$ is any number including zero.

Examples of polyols represented by this more common type agent useful in the process hereof are ethylene glycol; diethylene glycol; triethylene glycol; tetraethylene glycol; propylene glycol; dipropylene glycol; tripropylene gylcol; tetrapropylene glycol; polyethylene glycols (molecular weights above the tetra compound); polypropylene glycols; polybutylene glycols; ethylene glycol mono-methyl, ethyl and butyl ethers; corresponding diethylene glycol mono-ethers; triethylene glycol mono-methyl and ethyl ethers; propylene glycol mono-methyl ether; corresponding dipropylene and tripropylene glycol mono-methyl ethers; polyethylene glycol mono-methyl ethers (molecular weights 350 to 750); diethylene glycol di-ethyl ether; methyl Cellosolve acetate; Carbitol acetate; methoxy triglycol acetate; polyethylene glycol chloride and triethylene glycol dichloride.

While polyols and their described derivatives which are liquid at ordinary temperatures are preferred, they may be solids with melting points ranging up to about 150° C., or even higher. It is only important that the polyol be a liquid under grinding conditions. Since considerable heat is produced in the grinding, such solid agents give quite satisfactory results under conditions where (a) the developed heat is great enough to melt the agent or (b) in certain cases, a small amount of water, sufficient to dissolve or at least partially dissolve the agent, is present. Also, if desired additional heat can be applied during grinding in order to employ high melting polyols in liquid form. On the other hand, if a low boiling point conditioning agent is employed, the mixture may be cooled during grinding to prevent undue loss of such agent because of evaporation.

Most efficient grinding is obtained by including a conventional grinding aid, such as salt, in the mixture. However, the grinding aid is not an essential part in the mixture of pigment and organic conditioning agent. Equivalents of sodium chloride as the solid grinding aid in our invention are other water soluble inorganic salts, such as sodium carbonate, sodium bicarbonate, sodium sulfate, and water soluble organic compounds, such as sugar and urea.

In order to obtain the desired granular, discontinuous mixture hereof which requires a high power input for attrition grinding, it is important that the proper amount of organic conditioning agent be incorporated in the mixture. If too little conditioning agent is employed based on the weight of solids in the mixture, the mixture remains powdery, and grinding does not require high energy input nor does it effectively produce the desired conditioned pigment. If too high a proportion of conditioning agent is added so that the mixture exceeds its saturation point above which the system is continuous and pasty, the pasty mixture also requires comparatively little energy for grinding, and this type of paste grinding does not effectively produce the desired pigment properties.

However, when sufficient organic conditioning agent is added in accordance with this invention to change the pigment mixture from powdery to a granular, non-powdery mixture in which tough lumps are formed during grinding to provide a discontinuous mixture, a high amount of energy is required to grind this mixture. It is the severe attrition and shear employed to grind this mixture which causes the improved conditioned pigment hereof to be formed.

For most pigment mixtures, between about 0.03 and 0.25 part by weight of organic conditioning agent for each part by weight of total solid compounds provides the tough granular mixture necessary for obtaining the desired conditioned pigment. The total solids are composed of pigment, grinding aid, and any other solid additives that may be present. This ratio varies very little with different pigments or with varying ratios of pigment to grinding aid. In general when the organic conditioning agent is added to the pigment mixture until the mixture reaches the saturation point of such conditioning agent, a fairly sharp breaking point is observable at which point the mixture changes from a discontinuous, granular system into a continuous, pasty system. Accordingly, this saturation point is the most accurate way of determining the upper limit of the amount of organic conditioning agent that may be added to the mixture. When this saturation point has been reached, an increase of even 0.01 part by weight of conditioning agent per part of solids is sufficient to change the mixture into a paste and prevent conditioning of the pigment by the method hereof. Consequently, it is important not to add more conditioning agent than will exceed this saturation point.

The solids in the mixture may be composed entirely of pigment. However, best results are obtained when a grinding aid is also employed since the grinding aid increases the efficiency of the process. The ratio of the grinding aid to pigment is not critical. Both low and high ratios of grinding aid to pigment may be used, the selection of a ratio for a given pigment being largely a matter of economics and efficiency of the grinding treatment. In general, it is not economical and no advantage is obtained by using more than about 9 parts by weight of grinding aid per part of pigment. At least 0.25 part by weight grinding agent per part by weight pigment is preferred for best results.

Most pigment-polyol combinations can be employed in this process by mixing the total amounts of the three ingredients prior to the start of the grind. However, it has been found that in most cases superior results are obtained by adding the organic conditioning agent in successive incremental amounts during the grinding operation.

Only masticator machines of the heavy duty dispersion mixer type provide the severe grinding conditions required for the mixtures of this process. Examples of such machines are the Baker-Perkins dispersion mixer and the Banbury mixer. Dough mixers, also referred to as Werner-Pfleiderer mixers, which employ double mixing blades of the so-called "sigma" type, are totally incapable of exerting sufficient shearing action on the mixtures of our invention. Likewise, ball mills, rod mills, roller mills and edge runners, also known as pan mixers, are ineffective in this process due to inadequate power for the shearing action required.

The granular mixtures hereof are so tough that a very large amount of power must be put into the grinding step as compared to prior art grinding procedures. The difference in the power required to grind the mixture hereof is a difference of kind and not merely of degree. Whereas the mixing blades of dough mixers commonly used in the prior art are held between thin shafts, the shafts in masticator mixers are very much larger in diameter, approaching that of the blades themselves. The blades have a helical or single curved shape, rather than the "sigma" shape of dough mixer blades.

Figure 2:
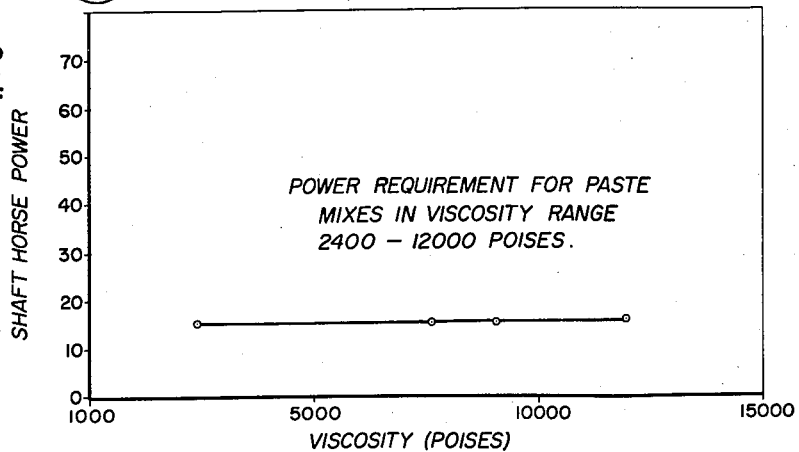
Fig. 2 is a graph showing the low amount of power required for grinding pasty mixes over the wide viscosity range of between 12,000 poises and 2,400 poises. The data for the graph is also given in Example 2.

Figs. 1 and 2 illustrate in graph form the very wide difference between the power applied by the grinding blades in our conditioning process and the power required in the paste or powder grinding of the prior art. These graphs were plotted from data obtained in accordance with Example 2. The relationship between elapsed time and shaft horsepower is shown in Fig. 1, which also indicates the power required to turn the rotors when the machine was empty, and when it contained the pigment-salt mixture without the polyol conditioning agent. A rapid increase of shaft horsepower occurred as the conditioning agent was added, and it reached a substantially constant maximum at 127–129 horsepower. This indicates the tremendous power required to grind the mixture hereof and condition the crude pigment.

A similar test was carried out in the same machine except that pasty pigment dispersions over a wide viscosity range were ground to determine the power requirements for grinding prior art pasty mixtures. The data are set forth in Example 2 and plotted in graph form in Fig. 2. The shaft horsepower over the wide range of plasticity tested was found to be between 15 and 16 horsepower.

Viscosities were measured at 25° C. on freshly stirred samples by means of a modified MacMichael torsion type viscometer. In this appartus the cup had an inside diameter of 3 cm., the bob was 1 cm. in diameter and the end of the bob was immersed 3.53 cm. in the sample. The cup rotated at 20 r.p.m. The readings obtained on the instrument scale were converted to viscosity expressed in poises by substituting in the fundamental equation for a torsion viscometer the applicable dimensions, the constants of the torsion wire obtained from the manufacturer, and a proportionality constant (0.861) which was obtained by checking against a heavy oil of known viscosity certified by the National Bureau of Standards. Since the mixtures of our invention are not plastic nor pasty in nature, no viscosity measurements are possible on such mixtures.

It is apparent from Figs. 1 and 2 that power input required for grinding the specific mixture hereof is more than 8 times the power required for grinding a pasty mix of any measurable viscosity or for grinding a powder that does not contain the organic conditioning agent. In general the various granular mixtures hereof require at least about 4 times the power required for grinding the powdery or pasty mixes previously employed in order to condition the pigment.

Salt and salt-solvent conditioning processes of the prior art have operated at relatively low temperatures, not over 40° or 50° C. The extreme shearing in the process of the present invention gives rise to much greater heat development. In general, a temperature of not less than 50° C. is developed in the mixture during grinding and it may be as high as 150° C., or even higher.

The grinding step of the process may be sufficient to condition some pigments in as short a time as 15 minutes. In other cases the time can vary up to two hours or even more. Any amount of grinding is sufficient to improve the tinctorial strength of the crude pigment. Preferably, the grinding step is continued until the pigment shows no further increase in strength.

One of the important advantages of the process hereof lies in the extreme simplicity of the steps subsequent to grinding. Instead of solvent stripping by distillation, or washing procedures with acids, alkalies or alcohol as required by prior processes, the grinding aid and organic conditioning agents in the ground mixture are removed very easily by extraction with water. The solution containing the dissolved grinding aid and conditioning agent is then easily separated from the pigment by any mechanical process, such as by filtration.

The filter cake containing the conditioned pigment may subsequently be utilized in several ways. For example, the pigment may be flushed directly from the aqueous cake into oil vehicles by methods well known in the art. In such methods, the addition of oil vehicles to the cake causes separation of the water in one phase from the oil and pigment in another phase. The water is then separated by any means such as by decantation. Alternatively, the cake may be converted into various aqueous pulp forms for use in water paints and other fields; or it may be dried and ground by well known methods for use as a dry color. Organic pigments conditioned by this process have been found unexpectedly to have such exceptionally soft texture that dry grinding may be eliminated. As a result, the products may be used directly in dry lump form for incorporation in various compositions, such as paints, inks, rubber, and linoleum.

If desired, insoluble, inert extenders or substrata, such as blanc fixe, alumina hydrate, titanium dioxide, calcium carbonate or barium rosinate, may be incorporated with the mixture of pigment and organic conditioning agent in the grinding step of our process for the purpose of manufacturing extended colors or lakes. This is of particular advantage in the case of certain very expensive pigments, since handling losses with extended pigments represent smaller yield losses of the costly ingredient.

Furthermore, the process hereof is simpler and more efficient than previous methods thereby resulting in saving in time and in over-all economy of operation. In addition, the method results in the elimination of hazardous, low boiling solvents, and in large increases in production capacity, especially in comparison with ball milling. Furthermore, it provides an excellent conditioned pigment without use of the expensive and undesirable acid-pasting processes used in organic pigment conditioning.

A number of unexpected advantages are obtained in the properties of the conditioned pigments by the present method as compared with corresponding products conditioned by prior art methods. The pigments have an exceptionally soft texture in the dry state, as a result of which the products are usable in lump form. This eliminates the necessity for dry grinding the conditioned pigments. Furthermore, the pigments hereof have a low vehicle absorption in either oil or water systems, which makes possible dispersions of increased pigment content with resultant high strength compositions. For example, press cakes of conditioned pigment can be made with fifty percent by weight pigment and fifty percent water, whereas press cakes of pigments conditioned by other processes generally cannot be prepared in proportions greater than forty percent pigment to sixty percent water. Similarly press cakes flushed into oil vehicles may give forty percent pigment content as compared with thirty percent of pigment conditioned by other processes to give the same consistency and flow properties.

The following are examples of the conditioning of various pigments in accordance with this invention.

*Example 1*

850 grams crude phthalocyanine blue containing 4.42 percent chlorine, 567 grams common table salt and 155 grams polyethylene glycol, $HO(C_2H_4O)_nC_2H_4OH$, molecular weight 400, were placed in a heavy duty dispersion mixer. The mixture was ground for 2¾ hours. An additional 81.5 grams of polyethylene glycol was added in small increments during the grinding period, and the mixture formed tough granular lumps of varying sizes. During grinding the temperature in the mix rose to 80–85° C.

After the grinding had been completed, as evidenced by the mull-out tests on portions of the mix indicating that the tinctorial strength does not substantially increase upon further grinding, the mass was discharged from the mixer. A 30 gram sample was boiled in one liter of water and filtered to remove the polyethylene glycol and salt. The washing was repeated several times until substantially all the water soluble material was removed, and then the filter cake was dried at 70–75° C.

Mull-out tests in bodied linseed oil using zinc oxide extensions showed that the finished pigment was 10 percent stronger than a high quality commercial phthalocyanine blue pigment of corresponding shade, whereas the crude pigment before processing was 55 percent weaker than the commercial product.

The mull-out test used in strength estimations in these examples was based on American Society of Testing Materials Method D–387–52T (1952), the procedure being as follows:

A dry sample of the unknown pigment and a sample of the reference (Standard) pigment are each mulled 200 revolutions on a Hoover muller (with the "100" weight) using, for example, 300 milligrams pigment and 700 milligrams bodied linseed oil (55–65 poises). Small amounts of the masstone inks thus prepared are placed in juxtaposition on white paper and drawn down in the well known manner to compare the relative hue and transparency characteristics of masstone and undertone.

The two masstone inks are then extended with zinc oxide by dispersing 200 milligrams of the mulled ink in 10 grams of zinc oxide paste by the hand spatula method. The zinc oxide white paste has the following composition:

78% zinc oxide
16% alkali refined linseed oil, meeting Government Specification MIL-O-15180
5% bodied linseed oil (as used for the masstone ink)
1% eugenol (anti-skinning agent)

After comparing the tint inks for relative strengths by drawing them down on paper, as in the case of the masstone inks, successive weighed amounts of zinc oxide paste are added to the stronger of the two masstone inks until the two tint inks are of equal strength by visual observation. The percent strength or weakness of the unknown sample in comparison with the standard or reference pigment is then calculated by means of the following formulas:

(1) Where the unknown ($u$) is stronger than the reference standard ($s$) and additional zinc oxide paste is added to the former to bring the two to equal strength:

$$\text{"Percent strong"} = \frac{u-s}{s} \times 100$$

where
$u$ = total grams white paste added to the unknown,
$s$ = grams white paste in standard.

(2) Where the unknown ($u$) is weaker than the reference standard ($s$) and additional zinc oxide paste is added to the latter to bring to equality:

$$\text{"Percent weak"} = \frac{s-u}{s} \times 100$$

Applying these formulas to the mull-out data obtained in Example 1, (1) Processed pigment ($u$) = 11.0 grams zinc oxide paste
Commercial pigment ($s$) = 10.0 grams zinc oxide paste Processed pigment is $\frac{11-10}{10} \times 100$ or 10% strong (2) Crude pigment ($u$) = 10.0 grams zinc oxide paste
Commercial pigment ($s$) = 22.0 grams zinc oxide paste Crude pigment is $\frac{22-10}{22} \times 100$ or 54.5% weak

*Example 2*

125 lbs. crude phthalocyanine blue containing 4.42 percent chlorine, 300 lbs. table salt were placed in a jacketed dispersion mixer (100 H.P., 100 gals. working capacity). The material was mixed for ¼ hour, whereupon 35 pounds (85 percent of total) of polyethylene glycol (mol wt. 400) was added in several increments over a period of 1 hour while the grinding continued. At this time 6 lbs. additional polyethylene glycol was added, and the grinding was continued to a total of 3 hours. Cold water was used in the jacket to control the heat evolved by the grinding action. The temperature of the mass at the time of discharge was 145° C.

At intervals during the grinding process, power readings were taken on a recording wattmeter connected with the motor of the grinder, and the shaft horsepower required for grinding was calculated using the efficiency curves for the motor of the mixer and the following equation:

H.P. output = meter readings × 160 × 1.34 × motor efficiency

The following data were obtained, and plotted in graph form in Fig. 1:

| Time (hours): | Horsepower (shaft) |
|---|---|
| 0 | 7.5 |
| 0.25 | 9.0 |
| 1.0 | 27.4 |
| 1.03 | 34.4 |
| 1.16 | 50.9 |
| 1.22 | 65.4 |
| 1.25 | 85.1 |
| 1.5 | 127.5 |
| 1.75 | 127.5 |
| 2.3 | 127.5 |
| 2.5 | 129.0 |
| 3.0 | 129.0 |

This illustrates the surprising increase in power required for grinding the hard granular mixture produced by adding polyethylene glycol to the mixture in the amounts specified. Strength tests by the mull-out procedure described in Example 1 on samples taken from the mix showed that at 1.25 hours' elapsed time the pigment was 15 percent weaker than the reference standard, whereas samples taken in the 2 to 3 hour range (maximum constant horsepower) showed the conditioned pigment to be 15 to 18 percent stronger than the commercial phthalocyanine blue pigment used as a reference standard. The initial crude pigment before processing was 55 percent weaker than the reference standard.

After removal of the ground material from the mixer, it was washed by decantation with 1200 gallons of hot water. This procedure was repeated until substantially all of the soluble ingredients had been removed. The pigment was then filtered through a plate and frame press, giving a press cake containing 52 percent solids as compared with 20 to 30 percent solids in usual commercial practice. The press cake referred to above was flushed into an alkyd resin type ink vehicle. The low vehicle absorption of our conditioned pigment was shown by the fact that the resulting ink contained 36 percent pigment but had the same flow properties as an ink containing 26 percent pigment, which was flushed from the press cake of a corresponding standard commercial phthalocyanine blue.

A similar grinding experiment was carried out in the same machine during the mixing of a pigment dispersion corresponding to the pasty or doughy mixes of the prior art. The viscosity of the composition as the liquid component was added decreased from 12,000 to 2400 poises. The shaft horsepowers over this wide range of plasticity were measured and are given on the following chart, which is plotted in graph form in Fig. 2:

| Viscosity (poises), 25°C.: | Horsepower (shaft) |
|---|---|
| 12,000 | 15.8 |
| 9,000 | 15.0 |
| 7,500 | 15.0 |
| 2,400 | 15.0 |

Above this viscosity range there are no reliable means of measuring viscosity, and below the range the mixtures become very thin pastes. It is impossible to measure the viscosity of the tough, granular mixture made in accordance with the present invention.

*Example 3*

280 grams crude phthalocyanine green (polychloro copper phthalocyanine), 1220 grams table salt and 120 grams polyethylene glycol (mol. wt. 400) were placed in a heavy duty dispersion mixer of 0.7 gallon capacity and ground for 2 hours, 14 grams additional polyethylene glycol being added during the grinding period. The material was then discharged and washed by decantation in 20 liters of hot water. The washing was continued until all the soluble material had been removed. The slurry was filtered and the press cake dried in an oven at 70–75° C.

The resulting product was a pigment with a talc-like texture having a tinctorial strength by mull-out test 20 percent stronger than a high quality commercial phthalocyanine green. The initial crude green was by the same test 75 percent weaker than the same commercial phthalocyanine green. It was observed that the conditioned pigment of this example could be incorporated without further pulverizing into a suitable vehicle to make an ink or paint with high strength and excellent purity of tone.

*Example 4*

100 lbs. crude phthalocyanine green, 200 lbs. salt and 25 lbs. polyethylene glycol (mol. wt. 400) were added to a 100 gal. heavy duty dispersion mixer of the type used in Example 2. The mixture was ground for 2½ hours. An additional 100 lbs. salt were added during the first half hour, and 15 lbs. of polyethylene glycol were added during the grinding period to maintain a mass that was neither powdery nor pasty, but which had the characteristics of hard, compacted and sandy granules. The temperature during the grind rose above 100° C.

After discharging from the mixer, the ground mass was washed by decantation with 900 gallons of boiling water. The washing was continued until the pigment was free from soluble ingredients. The color was then filter pressed, the press cake showing a dry content of 50 percent as compared with 30 to 40 percent in usual commercial practice.

Mull-out tests on a dried sample showed that the conditioned product was 10 percent stronger than a high quality commercial phthalocyanine green, the initial crude green being, as in Example 3, 75 percent weaker than the same reference pigment.

The press cake obtained above was flushed into an alkyd resin type ink vehicle giving 40 percent pigment content in the ink. In a similar flushing with a standard commercial pigment it was possible to incorporate only 30 percent to produce an ink with the same consistency and flow properties. This comparison indicates clearly the advantageous decrease in vehicle absorption obtained in pigments conditioned by the process of this invention.

*Example 5*

283 grams crude, red shade phthalocyanine blue (4.42 percent chlorine), 1131 grams sodium chloride and 156 grams polyethylene glycol (mol. wt. 400) were ground for 2 hours in a 0.7 gal. heavy duty dispersion mixer. During the grinding period an additional 14 grams of polyethylene glycol was added. After removal of the water soluble ingredients, as in Example 1, the pigment showed by mull-out test that it was 38 percent stronger than the commercial reference pigment, the initial crude pigment being 55 percent weaker than the latter.

*Example 6*

283 grams crude, green shade phthalocyanine blue, 1131 grams sodium chloride and 140 grams polyethylene glycol (mol. wt. 400) were ground for 2 hours in a 0.7 gal. heavy duty dispersion mixer. After extraction of the water soluble material, following the procedure of Example 1, the conditioned pigment showed by mull-out test a strength 20 percent greater than a commercial phthalocyanine blue of the same green shade. The initial crude material was 80 percent weaker than the same reference standard.

*Example 7*

354 grams phthalocyanine green (polychloro copper phthalocyanine), 1060 grams common salt and 159 grams propylene glycol, $HOC_2H_3CH_3OH$, were mixed and ground in a 0.7 gal. dispersion mixer for 2 hours. A sample of the product, after extraction with water and drying as in Example 1, was by mull-out test 20 percent stronger than the commercial phthalocyanine green reference standard used in Example 4, the initial crude pigment being 75 percent weaker than the same reference pigment.

*Example 8*

A mixture containing 354 grams crude, red shade phthalocyanine blue (as in Example 5), 1060 grams salt and 120 grams of 1,2,6 hexane triol, $C_6H_{11}(OH)_3$, M.P. 32.8° C., was ground for 2 hours in a 0.7 gal. dispersion mixer. 39 grams of extra triol were added during the grind. After about 1 hour of grinding the temperature of the mix was 110° C. A sample taken after 2 hours was finished as in Example 1. A mull-out test showed the condition pigment to be 35 percent stronger than a commercial phthalocyanine blue of corresponding shade. The initial crude blue was 55 percent weaker than the same reference blue.

*Example 9*

The procedure of Example 7 was followed, with the substitution of the propylene glycol by 167 grams 1,4 butane diol, $C_4H_8(OH)_2$. A sample finished as in Example 1 showed the conditioned product equal in strength to a high quality commercial phthalocyanine green, as compared with the initial crude which was 75 percent weaker than the same reference green.

*Example 10*

The procedure of Example 7 was followed, substituting 128 grams of trimethylol propane, $C_3H_5(CH_2OH)_3$ or $C_6H_{11}(OH)_3$, M.P. 58° C. for the propylene glycol. A sample after 2 hours grinding, treated as in Example 1, showed the conditioned product equal in strength to the commercial phthalocyanine green reference standard.

*Example 11*

The procedure of Example 7 was followed, using as the polyol 145 grams of Polyglycol 11–80, a trihydroxy polypropylene glycol. A sample after 2 hours' grinding, treated as in Example 1, gave a conditioned pigment equal in strength to the commercial phthalocyanine green reference standard.

*Example 12*

The procedure of Example 7 was followed, substituting for the propylene glycol 136 grams methoxy triglycol acetate, $(CH_3CO)O(C_2H_4O)_2C_2H_4OCH_3$. A sample after 2 hours' grinding, finished as in Example 1 showed the conditioned product to be 30 percent stronger than the phthalocyanine green reference standard.

*Example 13*

The procedure of Example 7 was followed, substituting for the propylene glycol 145 grams of Carbitol acetate, $(CH_3CO)O(C_2H_4O)C_2H_4OC_2H_5$. After 2 hours' grinding, a sample finished as in Example 1 showed the conditioned pigment to be 20 percent stronger than the phthalocyanine green reference standard.

*Example 14*

A mixture containing 354 grams crude, red shade phthalocyanine blue, 1060 grams salt and 156 grams dipropylene glycol methyl ether, $HO(C_3H_6O)C_3H_6OCH_3$, was ground for 2 hours in a 0.7 gal. dispersion mixer. A sample was then finished as in Example 1 giving a conditioned pigment 30 percent stronger than a commercial phthalocyanine blue of corresponding shade used as reference standard.

*Example 15*

The procedure of Example 14 was followed, substituting for the dipropylene glycol methyl ether 120 grams polyethylene glycol (mol. wt. 1000), freezing point range 37–40° C. After 2 hours' grinding a sample, finished as in Example 1, gave a conditioned pigment 15 percent stronger than the commercial phthalocyanine blue reference standard.

*Example 16*

354 grams crude phthalocyanine blue, 1060 grams urea and 251 grams polyethylene glycol (mol. wt. 400) were ground for 2 hours in a 0.7 gal. dispersion mixer. A sample, finished as in Example 1, showed the conditioned pigment to be 12 percent stronger than the commercial phthalocyanine blue reference standard.

*Example 17*

354 grams crude, red shade phthalocyanine blue, 1060 grams sucrose and 163 grams polyethylene glycol (mol. wt. 400) were ground for 2 hours in a 0.7 gal. dispersion mixer. A sample of the ground mixture, finished as in Example 1, proved to be by mull-out test 30 percent stronger than the commercial reference standard.

*Example 18*

354 grams crude, red shade phthalocyanine blue, 1060 grams sodium sulfate and 124 grams polyethylene glycol (mol. wt. 400) were ground for 2 hours in a 0.7 gal. dispersion mixer. A sample, finished as in Example 1, showed the conditioned pigment to be 10 percent stronger than the commercial reference standard.

*Example 19*

142 grams indanthrone (commercial Indanthrene Blue RSA) 1270 grams table salt and 109 grams polyethylene glycol (mol. wt. 400) were ground for 1 hour in a 0.7 gal. dispersion mixer. A sample, finished as in Example 1, showed by mull-out test that the conditioned pigment was 75 percent stronger than the original material.

*Example 20*

A mixture containing 226 grams Helio Fast Scarlet RA Base (a vat dye pigment, also referred to as perylene red), 980 grams sodium bicarbonate and 96 grams polyethylene glycol (mol. wt. 400) was ground for 1 and ½ hours in a 0.7 gal. dispersion mixer. A sample, finished as in Example 1, showed by mull-out test a strength increase of 30 percent over the starting material.

*Example 21*

A mixture containing 283 grams crude Permanent Violet RL, which is carbazole dioxazine violet (references —BIOS 960 and "Chemistry of Synthetic Dyes" by K. Venkataraman (1952), vol. II, page 786), 1414 grams sodium chloride and 112 grams polyethylene glycol (mol. wt. 400) was ground for 2 hours in a 0.7 gal. dispersion mixer. A sample, finished as in Example 1, showed by mull-out test a strength increase of 53 percent over the original crude material.

*Example 22*

A mixture containing 354 grams crude, red shade phthalocyanine blue, 89 grams blanc fixe, 970 grams common salt and 92 grams polyethylene glycol (mol. wt. 400) was ground for 2 hours in a laboratory (0.7 gal.) dispersion mixer. The polyethylene glycol was added in two successive portions of 69 and 23 grams. A sample of the product was extracted with water, filtered and dried as in Example 1. A mull-out test showed that the extended pigment (containing 20 percent blanc fixe) was 45 percent stronger than the initial crude pigment.

*Example 23*

A mixture containing 354 grams crude, red shade phthalocyanine blue, 1060 grams common salt and 78 grams diethyl Carbitol, $C_2H_5O—(C_2H_4O)C_2H_4OC_2H_5$, was ground for 2 hours in a laboratory dispersion mixer, the diethyl Carbitol being added in two increments of 63 and 15 grams. A sample of the product, extracted with water and finished as in Example 1, showed by mull-out test a strength 50 percent greater than the initial crude pigment.

*Example 24*

A mixture containing 354 grams crude phthalocyanine green, 1060 grams common salt, 50 grams 2,2-dimethylol propane, $HOH_2C—C(CH_3)_2—CH_2OH$, and 16 grams water was added to a laboratory dispersion mixer. After 10 minutes' grinding 53 grams more neopentyl glycol were added to the mass and the grinding was continued 50 minutes. At this point the temperature of the mass reached 95° C.

At the end of the first hour 10 grams water were added and after 1 and ¾ hours 21 grams more water were added to maintain the grinding consistency desired in the mass. At the end of 2 hours a sample, extracted with water and finished as in Example 1, showed by mull-out test a strength 70 percent greater than the original crude green pigment.

*Example 25*

A mixture containing 354 grams crude, red shade phthalocyanine blue, 1060 grams salt and 41 grams polybutylene glycol, $HO(C_4H_8O)_nC_4H_8OH$ (average mol. wt. 500), was added to a laboratory dispersion mixer. During the course of a 2 hour grinding period 48 grams more polybutylene glycol were added in small increments. A sample of the ground mass, extracted with water and finished as in Example 1, indicated by mull-out test a strength 50 percent greater than the initial crude blue pigment.

Example 26

119 grams of the vat dye dichloro-isoviolanthrone (Colour Index 1104), 900 grams common salt and 120 grams polyethylene glycol (mol. wt. 400) were ground together for ½ hour in a laboratory dispersion mixer. A sample of the ground product, extracted with water and finished as in Example 1, showed by mull-out test a strength 250 percent greater than the initial crude violet pigment and 25 percent greater than a commercial lake color of this vat dye.

Example 27

A mixture containing 215 grams of a commercial azo maroon pigment, comprising the manganese salt of the coupling product from diazotized 2 chloro-4 aminotoluene-5 sulfonic acid and beta hydroxy naphthoic acid, 900 grams common salt and 65 grams polyethylene glycol (mol. wt. 400) was ground in a laboratory dispersion mixer. After ½ hour a sample, extracted with water and finished as in Example 1, showed a strength increase by mull-out test of 10 percent compared with the initial pigment powder. The masstone of the ground product became slightly darker and the undertone and tint changed to a yellower hue. The grinding of the batch was continued for another hour with the addition of 18 grams polyethylene glycol. A final sample, finished as before, showed by mull-out test no further strength change. The masstone became considerably darker without any loss of brightness.

Example 28

A mixture containing 354 grams crude, red shade phthalocyanine blue, 1060 grams sodium chloride and 44 grams polyethylene glycol chloride (mol. wt. 390–430), $HO-(C_2H_4O)_nC_2H_4-Cl$, was ground in a laboratory dispersion mixer. During a 2 hour period 50 grams of the polyethylene glycol chloride were added in small increments. A sample of the product, extracted with water and finished as in Example 1, showed by mull-out test a strength 13 percent greater than the commercial reference standard.

Example 29

225 grams indanthrone, 900 grams sodium bicarbonate and 91 grams of polyethylene glycol chloride (mol. wt. 390–430) were ground for 1 hour in a laboratory dispersion mixer. 13 grams of the glycol chloride were then added and the grinding continued for another ½ hour. At the end of this time a sample, finished as in Example 1, showed by mull-out test a strength increase of 60 percent in comparison with the original crude pigment. The undertone and tint of the conditioned pigment showed a markedly cleaner hue than that of the crude pigment.

Example 30

A mixture containing 300 grams crude phthalocyanine green, 900 grams sodium chloride and 25 grams triethylene glycol dichloride, $Cl-(C_2H_4O)_2C_2H_4-Cl$, was added to a laboratory dispersion mixer. During a grinding period of 1 hour 71 grams more triethylene glycol dichloride were added. Grinding was continued a second hour during which time 14 grams of the glycol dichloride were added. At the end of 2 hours a sample, finished as in Example 1, showed by mull-out test a strength increase of 50 percent in comparison with the original crude pigment.

Example 31

A mixture containing 1700 grams crude, red shade phthalocyanine blue, 425 grams sodium chloride and 56 grams polyethylene glycol (mol. wt. 400) was added to a Banbury mixer of one gallon capacity. The mixing was started and 298 grams more polyethylene glycol were added gradually. At this point wattmeter readings showed that the machine was beginning to consume the desired large amounts of power. Further addition of polyethylene glycol was then made in five increments totalling 77 grams over a period of 43 minutes from the start of the application of power.

A sample of the mix taken at the end of 33 minutes was extracted with water, filtered and dried as in Example 1. The product obtained showed by mull-out test that the conditioned pigment was equal in strength to a high quality, commercial red shade phthalocyanine blue pigment used as reference standard, whereas the original crude material was 55 percent weak compared to the same reference standard.

Example 32

A mixture containing 2125 grams crude, red shade phthalocyanine blue and 56 grams polyethylene glycol (mol. wt. 400) was added to a Banbury mixer of one gallon capacity. After the mixing was started 288 grams more polyethylene glycol were added, at which point the machine showed by wattmeter readings that it was beginning to consume large amounts of power. Further addition of polyethylene glycol was made in six increments totalling 183 grams over a period of 55 minutes from the start of the application of power.

A sample of the mix after 25 minutes' grinding, finished as in Example 31, showed by mull-out test that the mix at this point was 13 percent weaker than the commerical reference standard (as used in Example 31). A further sample taken after 37 minutes' grinding gave a strength equal to the reference standard.

We claim:

1. The method of producing a finely-divided, solid organic pigment of high tinctorial strength, soft texture and low vehicle absorption characteristics from a crude dry pigment of relatively low tinctorial strength and harsh texture, which comprises preparing a mixture of said crude dry, powdery pigment and an organic conditioning agent selected from the group consisting of polyols, ethers of polyols, esters of polyols, chlorinated derivatives of such polyols, and mixtures of said polyols, ethers, esters and chlorinated derivatives; said conditioning agent being liquid and substantially non-volatile during the grinding step hereinafter set forth and being at least slightly water soluble, and being present in an amount between about 0.03 and 0.25 part by weight conditioning agent per one part by weight of pigment, said amount of said conditioning agent being such as to convert said mixture during the grinding step hereinafter set forth into a discontinuous mass of tough, compacted granular particles wherein said pigment solids are adhesively bound by said conditioning agent, and said amount of said conditioning agent being not in excess of the saturation point of the mixture as indicated by its forming into a doughy or pasty mass at any time during the operation; subjecting said mass of compacted granular particles to grinding by internal shearing action which develops an energy input more than four times that required for grinding said crude pigment in the absence of said conditioning agent and more than four times that required for grinding a mixture of said crude pigment and said conditioning agent if it were in the form of a pasty mass; continuing said grinding of the compacted granular particles until the pigment possesses the desired tinctorial strength; and removing said conditioning agent from the thus ground mass by extracting the same with water.

2. The method of claim 1, wherein a water-soluble grinding aid is incorporated with said mixture in an amount of between about 0.25 and 9 parts by weight per part by weight of said pigment, and wherein said grinding aid is removed from the ground mass by extracting the same with water.

3. The method of claim 2 in which said grinding aid is salt.

4. The method of claim 1 in which said conditioning agent is selected from the group consisting of alkylene glycols, polyalkylene glycols, esters of said glycols, mono and di-ethers of said glycols, and chlorides of said glycols.

5. The method of claim 1 in which said conditioning agent is added to said pigment in successive incremental amounts during the grinding operation.

6. The method of claim 1 in which such grinding of said tough, compacted, granular particles is continued at said horsepower requirement until no further substantial increase in tinctorial strength of the pigment is obtained.

7. A finely-divided, solid, organic pigment of high tinctorial strength, soft texture and low vehicle absorption characteristics obtained from a crude dry pigment of relatively low tinctorial strength and harsh texture by the method of claim 1.

8. A finely-divided, solid, organic pigment of high tinctorial strength, soft texture and low vehicle absorption characteristics obtained from a crude dry pigment of relatively low tinctorial strength and harsh texture by the method of claim 2.

References Cited in the file of this patent

UNITED STATES PATENTS

| | | |
|---|---|---|
| 2,045,006 | Wiegand | June 23, 1936 |
| 2,065,762 | Stanley | Dec. 29, 1936 |
| 2,316,535 | Bohner et al. | Apr. 13, 1943 |
| 2,402,167 | Lang et al. | June 18, 1946 |
| 2,690,398 | Guertler et al. | Sept. 28, 1954 |
| 2,755,195 | Grubenmann | July 17, 1956 |
| 2,902,385 | Raab | Sept. 1, 1959 |